C. E. SWART AND G. W. SMITH.
PISTON RING COMPRESSOR.
APPLICATION FILED JULY 12, 1917.
1,303,614.
Patented May 13, 1919.
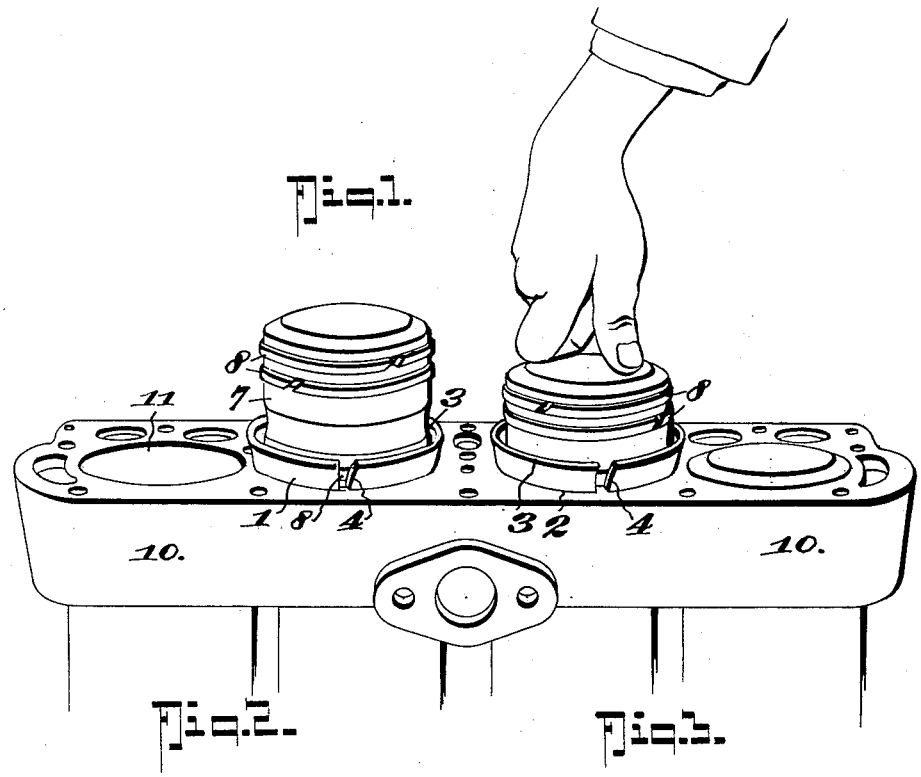
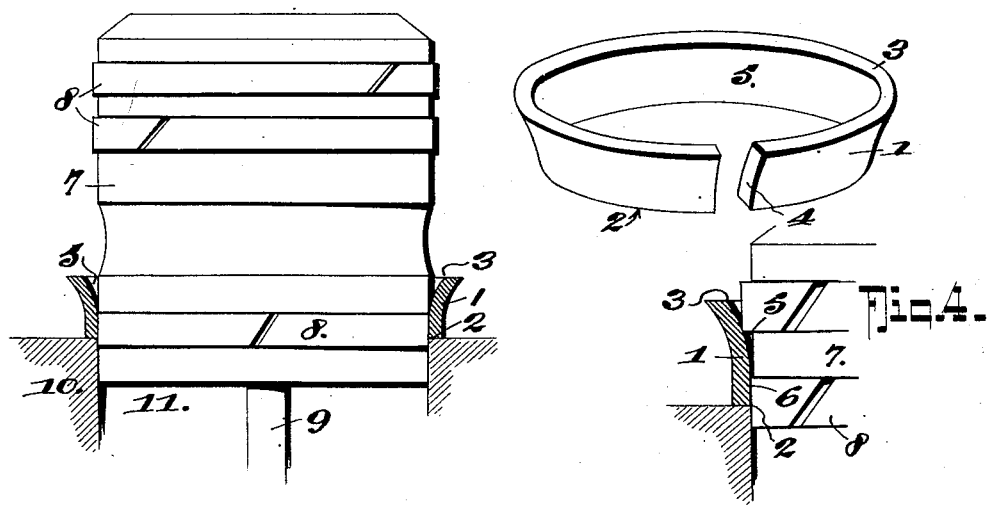
INVENTORS
C. E. Swart.
G. W. Smith.
BY
Fred G. Dieterich & Co
ATTORNEYS.

UNITED STATES PATENT OFFICE.

CHARLES E. SWART AND GRANT W. SMITH, OF CHATTANOOGA, TENNESSEE.

PISTON-RING COMPRESSOR.

1,303,614.

Specification of Letters Patent.

Patented May 13, 1919.

Application filed July 12, 1917. Serial No. 180,185.

*To all whom it may concern:*

Be it known that we, CHARLES E. SWART and GRANT W. SMITH, citizens of the United States, and residing in Chattanooga, in the county of Hamilton and State of Tennessee, have invented certain new and useful Improvements in Piston-Ring Compressors, of which the following is a specification.

The invention relates to a certain new and useful improvement in devices for compressing piston rings while inserting the pistons into their cylinders.

It is known that quite an effort is necessary and considerable time required to place pistons into their cylinder openings, due to the expansion of the rings while out of the cylinders, and devices have heretofore been employed for compressing the rings tightly around the piston while the piston is inserted into the cylinder. The devices heretofore provided consist of clamps which tend to expand but are held against the expansive tendency in contact with the piston to compress the piston rings usually by screw and lever devices which require manual manipulation to fit the same to the pistons before the devices can be used. The present invention has for its object to provide a very simple device for the insertion of the pistons and compression of the piston rings which requires no manual manipulation beyond merely setting it over the opening in the cylinder of the engine. To that end, the invention comprises a split ring of heavy metal whereby it will maintain its form against the expansion pressures of the piston rings, the compression ring being of two diameters to provide a flared entrance end of greater diameter than the expanded diameter of the piston rings, and an exit end of the same diameter as that of the exterior of the piston or the interior of the cylinder into which the piston is to be put whereby the rings will be automatically compressed as the piston is pushed down into the cylinder opening.

The invention also includes those novel details of construction, combination and arrangement of parts, which will be first fully described, then be specifically pointed out in the appended claims and illustrated in the accompanying drawings, in which:

Figure 1 is a perspective view illustrating the invention in use.

Fig. 2 is an enlarged side elevation of a piston being inserted into a cylinder opening, the cylinder being shown in section and the compression ring also being shown in section.

Fig. 3 is a perspective view of the invention, *per se*.

Fig. 4 is an enlarged detail section and part elevation of a slight modification of the invention.

In the drawing, in which like letters and numerals of reference indicate like parts in all of the figures, 1 represents the compression ring which is formed of two diameters, the end of lesser diameter 2 being such as to conform closely to the external diameter of the piston 7 or the diameter of the cylinder cavity 11, while the end of greater diameter 3 is greater than the diameter of the expanded rings 8, thus providing a flared entrance which gives an inclined inner wall 5 from the end of greater diameter to the end of lesser diameter so that as the pistons 7 are pushed down (see Fig. 1) the rings 8 are automatically compressed (see Fig. 2) and pass into the cavity 11 of the cylinder 10 without difficulty.

The ring 1 is split and has a portion removed, as at 4, so that it can pass over the connecting rod 9 in the event that it is found desirable to insert the piston from the bottom of the engine bore 11 rather than from the top whereby after the piston is in the bore the ring can be slipped off past the connecting rod.

The inclined surface 5 is preferably curved from one end 2 to the other end 3, although, if desired, a portion of the inner wall may be cylindrical, as at 6, and the remaining portion curved, as at 5, (see Fig. 4).

It will be observed by reference to Fig. 1, that all that is necessary is to set the ring 1 over the bore of the cylinder and push the piston down through it, when the piston rings will be automatically compressed and the piston will easily enter its bore without hanging up. It will be noticed that the resiliency of the metal of the ring 1 is such as to continuously tend to maintain its form shown in Fig. 3 and the inherent "spring" of the metal is such that it will oppose the expanding force of the rings 8 as they enter the compression ring 1 on the downward thrust of the piston. By splitting the ring 4 and making it of a semi-elastic construction it may be expanded to go over oversized pistons without the necessity of employing a separate ring for over-sized pistons, it being, of course, understood that the rings are made in sets conforming to the different standard diameters of pistons in the various engines in use.

From the foregoing description, taken in connection with the accompanying drawing, it is thought the complete construction, operation and advantages of the invention will be readily understood by those skilled in the art.

What is claimed is:

1. In a piston ring compressor, a semi-rigid split ring of two diameters, the end of lesser diameter adapted to closely conform to the diameter of the piston.

2. A piston ring compressor comprising a split ring of two diameters, the end of lesser diameter conforming to the diameter of the piston, and the end of greater diameter being greater than that of the expanded piston rings, said compressor ring itself adapted to maintain its diameters against the expansion force of the piston rings as they are compressed during the introduction of the piston.

CHARLES E. SWART.
GRANT W. SMITH.